(12) United States Patent
Sturm et al.

(10) Patent No.: US 11,189,078 B2
(45) Date of Patent: Nov. 30, 2021

(54) AUTOMATED UNDERSTANDING OF THREE DIMENSIONAL (3D) SCENES FOR AUGMENTED REALITY APPLICATIONS

(71) Applicant: GOOGLE LLC, Mountain View, CA (US)

(72) Inventors: Jürgen Sturm, Munich (DE); Martin Bokeloh, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/419,231

(22) Filed: May 22, 2019

(65) Prior Publication Data
US 2019/0392630 A1    Dec. 26, 2019

Related U.S. Application Data

(60) Provisional application No. 62/687,479, filed on Jun. 20, 2018.

(51) Int. Cl.
| | |
|---|---|
| *G06T 15/08* | (2011.01) |
| *G06T 19/00* | (2011.01) |
| *G06K 9/00* | (2006.01) |
| *G06T 7/593* | (2017.01) |
| *G06N 3/08* | (2006.01) |
| *G06T 17/00* | (2006.01) |
| *G06K 9/46* | (2006.01) |

(Continued)

(52) U.S. Cl.
CPC .......... *G06T 15/08* (2013.01); *G06K 9/00691* (2013.01); *G06N 3/08* (2013.01); *G06T 7/593* (2017.01); *G06T 19/006* (2013.01)

(58) Field of Classification Search
CPC ............... G01P 15/00; G06K 9/00691; G06K 9/00671; G06K 9/4604; G06K 9/6272; G06N 3/0454; G06N 3/08; G06T 15/08; G06T 19/006; G06T 7/593; G06T 17/00; G06T 2210/04
See application file for complete search history.

(56) References Cited

U.S. PATENT DOCUMENTS

| | | | |
|---|---|---|---|
| 2015/0228114 A1* | 8/2015 | Shapira ................ | G06K 9/4638 345/421 |
| 2016/0063993 A1* | 3/2016 | Dolan ................... | G06F 40/279 704/254 |

(Continued)

*Primary Examiner* — Sing-Wai Wu

(57) ABSTRACT

An electronic device is configured to performing a three-dimensional (3D) scan of an interior space. In some cases, the electronic device acquires information and depth measurements relative to the electronic device. The electronic device acquires voxels in a 3D grid that is generated from the 3D scan. The voxels represent portions of the volume of the interior space. The electronic device determines a trajectory and poses of the electronic device concurrently with performing the 3D scan of the interior space. The electronic device labels voxels representing objects in the interior space based on the trajectory and the poses. In some cases, the electronic device uses queries to perform spatial reasoning at an object level of granularity, positions, overlays, or blends virtual objects into an augmented reality representation of the interior space or modifies positions or orientations of the objects by applying a transformation to corresponding connected components.

20 Claims, 12 Drawing Sheets

(51) Int. Cl.
*G06K 9/62* (2006.01)
*G06N 3/04* (2006.01)

(56) References Cited

U.S. PATENT DOCUMENTS

| | | | |
|---|---|---|---|
| 2016/0171346 A1* | 6/2016 | Han | G06K 9/00624 |
| | | | 382/103 |
| 2017/0123066 A1* | 5/2017 | Coddington | G01C 15/002 |
| 2017/0213112 A1* | 7/2017 | Sachs | G06T 7/90 |
| 2019/0188473 A1 | 6/2019 | Witt et al. | |
| 2019/0188477 A1 | 6/2019 | Mair et al. | |
| 2019/0250627 A1 | 8/2019 | Witt et al. | |

* cited by examiner

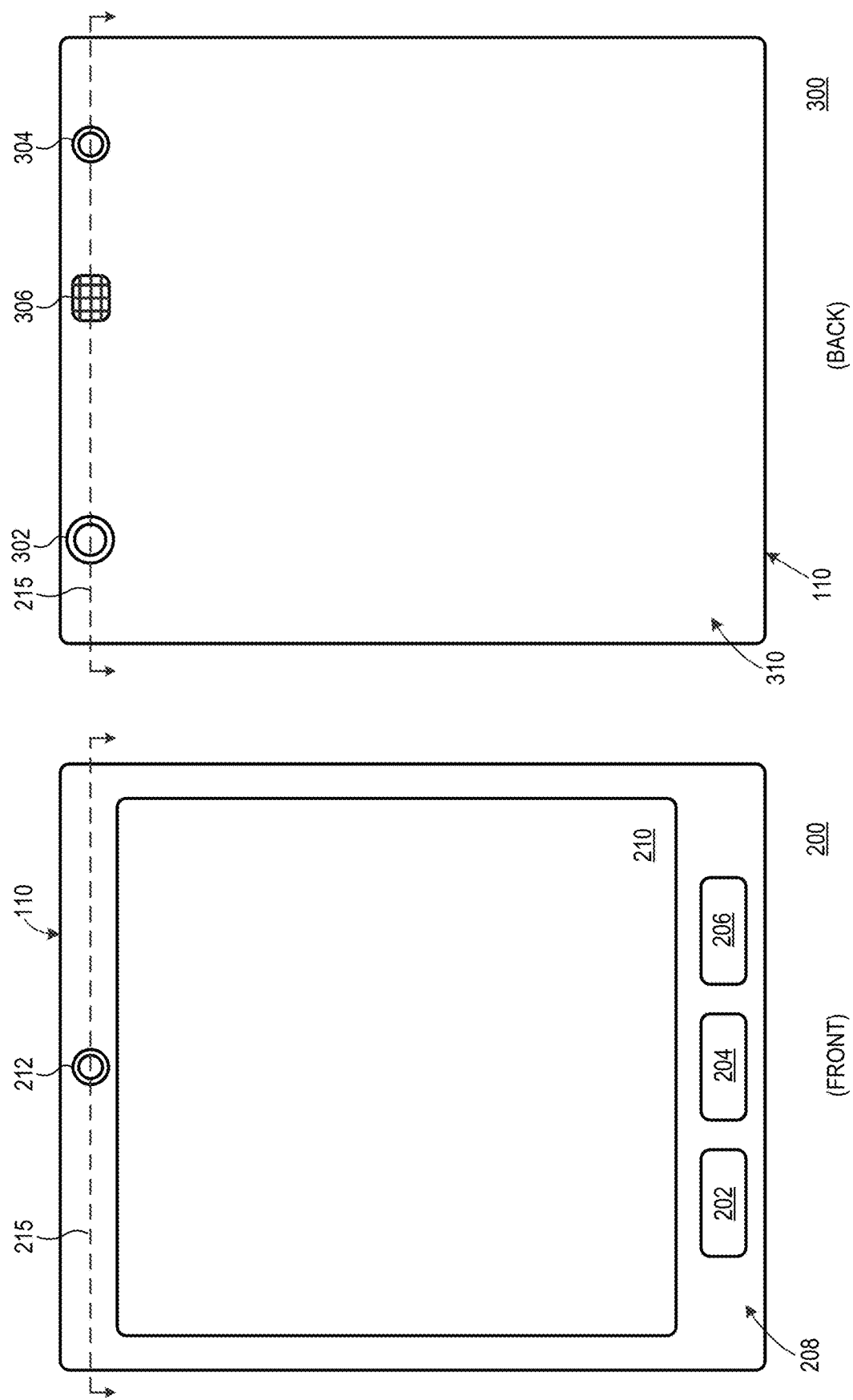

AUTOMATED UNDERSTANDING OF THREE DIMENSIONAL (3D) SCENES FOR AUGMENTED REALITY APPLICATIONS

CROSS REFERENCE TO RELATED APPLICATIONS

This application claims priority to the Provisional U.S. Patent Application No. 62/687,479 having a filing date of Jun. 20, 2018 and entitled "Automated Understanding of Three Dimensional (3D) Scenes for Augmented Reality Applications," which is hereby incorporated by reference in its entirety.

BACKGROUND

Augmented reality applications blend or overlay virtual content with the real world viewed by a user. For example, a user wearing glasses that include augmented reality functionality is able to view the real world through the glasses concurrently with viewing virtual content displayed by the augmented reality via the glasses. In some cases, the virtual content is not directly correlated with the scene that is viewed by the user. For example, a heads-up display can be used to superimpose virtual content such as a location, a speed, a compass direction, or other information that does not need to be precisely positioned relative to objects in the scene. However, in other cases, overlaying or blending the virtual content with the real world scene requires detailed spatial understanding of the scene that is viewed by the user. For example, a virtual reality application cannot accurately place an avatar in a chair without knowing the location and orientation of the chair. For another example, a virtual reality application cannot accurately place a virtual image onto a wall without knowing the location and pose of the wall. As used herein, the location and orientation of an object in the image is also referred to as a "pose," which can be defined using three coordinates to identify the location of the object and three parameters (such as pitch, roll, and yaw) to define the orientation of the object.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIGS. 2 and 3 illustrate example front and back plan views of an example implementation of the electronic device in a tablet form factor according to some embodiments.

DETAILED DESCRIPTION

Figure 1:
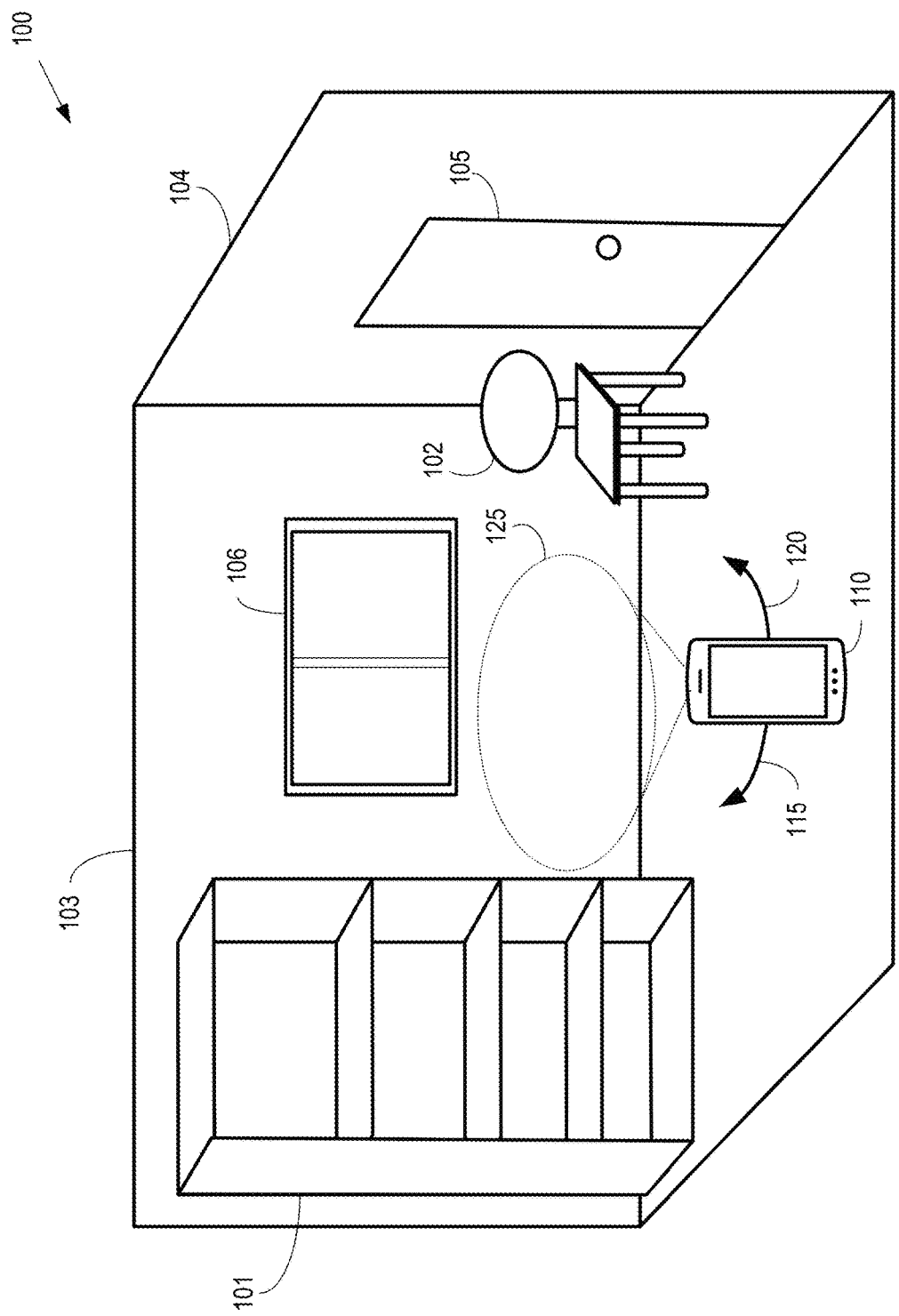
FIG. 1 is a diagram of an interior space and an electronic device that performs three-dimensional (3D) scanning of the interior space according to some embodiments.

Objects in a scene, such as chairs in a room, are identified in a three-dimensional (3D) model of a scene by capturing a dataset using an image capture device (such as a smart phone) as the image capture device moves in a 3D space that includes the objects. The dataset includes imaging information, depth measurements relative to the image capture device, and location/movement information for the image capture device. For example, a smart phone can capture RGB-D data that includes RGB values of pixels in an image and depth information that represents a distance from the smart phone to a surface in the 3D space. Some embodiments of the smart phone include an inertial measurement unit (IMU) that provides inertial information such as accelerations that are used to track motion of the smart phone. Other techniques for determining a trajectory of the smart phone, such as global positioning information, are used in some embodiments. A trajectory of the image capture device is determined in 3D space and then a 3D representation or model of the space is generated. Semantic class labels are then applied to the voxels, e.g., by a neural network such as a convolutional neural network (CNN) that is applied to voxels that represent the 3D model of the space. The CNN is trained using an annotated dataset. For example, the CNN can learn and apply class labels such as "chair," "table," "wall," and the like to voxels in the 3D model of the space. Based on the labels, the mesh representing the 3D model is segmented into connected components that are referred to herein as "instances." Thus, the 3D model of the scene is decomposed into a set of individual objects represented by the instances that are labeled by the CNN. In some embodiments, postprocessing is applied to the segmented 3D model to determine canonical poses of the objects that are identified in the 3D model. The canonical poses are used to automatically place objects within the 3D model of the scene.

Augmented reality applications or developers use the labeled objects in the 3D model of the scene, as well as the poses of the objects, to perform spatial reasoning at an object level granularity. Examples of queries that can be performed on the segmented, labeled 3D model include: how many chairs are in a room? Where is the closest chair? Where is the nearest wall? Is there a table and what is the location of the table? Spatial reasoning is also used to position, overlay, or blend virtual objects into the augmented reality representation of the 3D scene. For example, an augmented reality application can place an avatar in a seated position in one of the chairs in the room. For another example, an augmented reality application can place a virtual board game onto a table in the room. Augmented reality applications are also able to count the number of seating options in the room, query a surface area of the walls in the room (e.g., to paint the walls), query the surface area of the floor of the room (e.g., to re-carpet the room), and the like. The scene represented by the can be modified using an interface that allows a user to reposition objects within the scene. For example, a user can drag individual objects to different locations within the scene, rotate the objects, or make other modifications to the position and orientation of the object. The modifications of the position and orientation of an object can be represented as transforms such as a rotational transformation, a linear or translational transformation, and the like.

FIG. 1 is a diagram of an interior space 100 and an electronic device 110 that performs 3D scanning of the interior space 100 according to some embodiments. The interior space 100 encloses a volume that includes features such as furniture including a bookcase 101 and a chair 102, walls 103, 104, a door 105, and a window 106. Some embodiments of the interior space 100 include additional rooms, other types of furniture and various other objects that are disposed within the interior space 100.

The electronic device 110 is configured to support location-based functionality, such as simultaneous localization and mapping (SLAM) and augmented reality (AR), using image and non-image sensor data in accordance with at least one embodiment of the present disclosure. The electronic device 110 can include a portable user device, such as a tablet computer, computing-enabled cellular phone (e.g., a "smartphone"), a notebook computer, a personal digital assistant (PDA), a gaming system remote, a television remote, an AR/VR headset, and the like. In other embodiments, the electronic device 110 includes a fixture device, such as a personal service robot such as a vacuum cleaning robot, medical imaging equipment, a security imaging camera system, an industrial robot control system, a drone control system, a 3D scanning apparatus, and the like. For ease of illustration, the electronic device 110 is generally described herein in the example context of a portable user device, such as a tablet computer or a smartphone; however, the electronic device 110 is not limited to these example implementations.

The electronic device 110 includes a plurality of sensors to obtain information regarding the interior space 100. The electronic device 110 obtains visual information (imagery) for the interior space 100 via imaging cameras and a depth sensor disposed at a forward-facing surface and, in some embodiments, an imaging camera disposed at a user-facing surface. As discussed herein, the imaging cameras and the depth sensor are used to perform 3D scanning of the environment of the interior space 100. In some embodiments, a user holding the electronic device 110 moves through the interior space 100, as indicated by the arrows 115, 120. The user orients the electronic device 110 so that the imaging cameras and the depth sensor are able to capture images and sense a depth of a portion of the interior space 100, as indicated by the dotted oval 125. The captured images and the corresponding depths are then stored by the electronic device 110 for later use in generating a 3D grid representation of the interior space 100 and a 2D floor plan of the interior space 100.

Some embodiments of the electronic device 110 rely on non-image information for position/orientation detection. This non-image information can be obtained by the electronic device 110 via one or more non-image sensors (not shown in FIG. 1), such as a gyroscope, an inertial measurement unit, an ambient light sensor, a global positioning System (GPS), and the like. The non-image sensors also can include user interface components, such as a keypad (e.g., touchscreen or keyboard), microphone, mouse, and the like. The non-image sensor information representing a state of the electronic device 110 at a given point in time is referred to as the "current context" of the electronic device for that point in time. This current context can include explicit context, such as the relative rotational orientation of the electronic device 110 or the ambient light from the local environment incident on the electronic device 110. For example, the current context can include a 6 degree-of-freedom (6DoF) pose of the electronic device 110 that indicates 3D coordinates of the electronic device 110 within the interior space 100 and rotational coordinates of the electronic device 110 such as a pitch, roll, and yaw. The current context also can include implicit context information, such as information inferred from calendar information or clock information, or information inferred from a user's interactions with the electronic device 110.

In operation, the electronic device 110 uses the image sensor data and the non-image sensor data to determine a relative position/orientation of the electronic device 110, that is, a position/orientation relative to the interior space 100. In at least one embodiment, the determination of the relative position/orientation is based on the detection of spatial features in image data captured by one or more of the imaging cameras and the determination of the position/orientation of the electronic device 110 relative to the detected spatial features. Non-image sensor data, such as readings from an inertial measurement unit (IMU), a gyroscope, a magnetometer, an ambient light sensor, a GPS, a keypad, a microphone, and the like, also is collected by the electronic device 110 in its current position/orientation.

Some embodiments of the electronic device 110 combine the relative position/orientation of the electronic device 110, the pose of the electronic device 110, the image sensor data, and the depth sensor data to generate a 3D grid of voxels that represent the interior space 100 and features within the interior space 100 including the bookcase 101, the chair 102, the walls 103, 104, the door 105, and the window 106. Each voxel represents a portion of the volume enclosed by the interior space 100. The voxels include values of weights that indicate a number of observations that include the corresponding portion of the volume of the interior space 100 and signed distances relative to surfaces associated with the voxels.

The electronic device 110 is also able to identify objects in the 3D scan of the interior space 100. Some embodiments of the electronic device 110 implement a neural network such as a convolutional neural network (CNN). The electronic device 110 applies the CNN to voxels in the 3D grid that represents the interior space 100. The CNN learns semantic class labels that are applied to the voxels. For example, the CNN can apply class labels such as "chair," "table," "wall," and the like to voxels in the 3D grid that represents the interior space 100. In some embodiments, each voxel is associated with a probability distribution that indicates probabilities of each class label. For example, a voxel can be associated with a table including the probability distribution such as Table 1 below:

TABLE 1

| | |
|---|---|
| Wall | 0% |
| Chair | 40% |
| Sofa | 30% |

The table can be encoded by a vector of numbers such as [0, 0.4, 0.3, . . . ]. The CNN predicts the probability distribution for each voxel. Subsequently, discrete labels are assigned to each voxel by using a conditional random field (CRF), simple majority vote, or other decision-making process.

Voxel labels are transferred to a mesh that represents the 3D model. For example, each polygon, triangle, vertex, or other portion of the mesh is assigned the labeled based on the label of the voxel that corresponds to the portion of the mesh. Based on the labels, the mesh representing the 3D model is segmented into connected components that are referred to herein as "instances." Thus, the 3D model of the scene is decomposed into a set of individual objects represented by the instances that are labeled by the CNN. For example, the electronic device 110 can identify the bookcase 101, the chair 102, and the walls 103, 104 in the interior space 100. In some embodiments, postprocessing is applied to the segmented 3D model to determine canonical poses of the bookcase 101, the chair 102, and the walls 103, 104 so that these objects can be automatically placed within the 3D model of the interior space 100.

In some embodiments, spatial reasoning is applied to the individual objects that are represented by the segmented components of the mesh. For example, queries can also be constructed to query the 3D model of the interior space and determine answers to questions such as how many chairs are in a room? (one, the chair 102 in this case). Other queries can be constructed to determine locations of objects, proximity of objects to the electronic device 110, relative positions of objects, types of objects in the 3D model, sizes or areas of portions of the room, and the like. Spatial reasoning is also used to position, overlay, or blend virtual objects into the 3D model of the scene. For example, the pose of the chair 102 can be used to place an avatar seated in the chair 102 with the correct orientation to the chair 102. For another example, an augmented reality application can place a virtual book onto a shelf of the bookcase 101. The scene represented by the 3D model can be modified using an interface that allows a user to reposition objects within the scene. For example, a user can drag the chair 102 to a different location within the scene, rotate the chair 102, or make other modifications to the position and orientation of the chair 102. In some embodiments, modifications of the position and orientation of an object are represented as transformations such as rotational transformations, linear or translational transformations, and the like.

FIGS. 2 and 3 illustrate example front and back plan views of an example implementation of the electronic device 110 in a tablet form factor according to some embodiments. The electronic device 110 may be implemented in other form factors, such as a smart phone form factor, a medical imaging device form factor, and the like, which implement configurations analogous to those illustrated.

As illustrated by the front plan view 200 of FIG. 2, the electronic device 110 can include one or more user interface components, such as touch keys 202, 204, and 206 of a keypad disposed at a user-facing surface 208. The electronic device 110 also includes a display 210. Some embodiments of the display 210 are implemented as a touch screen display so as to facilitate user input and control via the user's interaction with the display 210. In the illustrated embodiment, the electronic device 110 further includes a user-facing imaging camera 212. The imaging camera 212 can be used to capture image data for the local environment facing the surface 208. Further, in some embodiments, the imaging camera 212 is configured for tracking the movements of the head or for facial recognition, and thus providing head tracking information that may be used to adjust a view perspective of imagery presented via the display 210.

As illustrated by the back plan view 300 of FIG. 3, the electronic device 110 includes a wide-view imaging camera 302, a narrow-view imaging camera 304, and a modulated light projector 306 disposed at a forward-facing surface 310.

In one embodiment, the imaging camera 302 is implemented as a wide-angle imaging camera having a fish-eye lens or other wide-angle lens to provide a wider angle view of the local environment facing the surface 310. The imaging camera 304 is implemented as a narrow-angle imaging camera having a typical angle of view lens to provide a narrower angle view of the local environment facing the surface 310. Accordingly, the imaging camera 302 and the imaging camera 304 are also referred to herein as the "wide-angle imaging camera 302" and the "narrow-angle imaging camera 304," respectively. As described in greater detail below, the wide-angle imaging camera 302 and the narrow-angle imaging camera 304 can be positioned and oriented on the forward-facing surface 310 such that their fields of view overlap starting at a specified distance from the electronic device 110, thereby enabling depth sensing of objects in the local environment that are positioned in the region of overlapping fields of view via multiview image analysis.

Some embodiments of a depth sensor implemented in the electronic device 110 use the modulated light projector 306 to project modulated light patterns from the forward-facing surface 310 into the local environment, and uses one or both of imaging cameras 302, 304 to capture reflections of the modulated light patterns as they reflect back from objects in the local environment. These modulated light patterns can be either spatially-modulated light patterns or temporally-modulated light patterns. The captured reflections of the modulated light patterns are referred to herein as "depth imagery." The depth sensor calculates the depths of the objects, that is, the distances of the objects from the electronic device 110, based on the analysis of the depth imagery. The resulting depth data obtained from the depth sensor may be used to calibrate or otherwise augment depth information obtained from multiview analysis (e.g., stereoscopic analysis) of the image data captured by the imaging cameras 302, 304. Alternatively, the depth data from the depth sensor may be used in place of depth information obtained from multiview analysis. To illustrate, multiview analysis typically is more suited for bright lighting conditions and when the objects are relatively distant, whereas modulated light-based depth sensing is better suited for lower light conditions or when the observed objects are relatively close (e.g., within 4-5 meters). Thus, when the electronic device 110 senses that it is outdoors or otherwise in relatively good lighting conditions, the electronic device 110 may elect to use multiview analysis to determine object depths. Conversely, when the electronic device 110 senses that it is indoors or otherwise in relatively poor lighting conditions, the electronic device 110 may switch to using modulated light-based depth sensing via the depth sensor.

Figure 4:
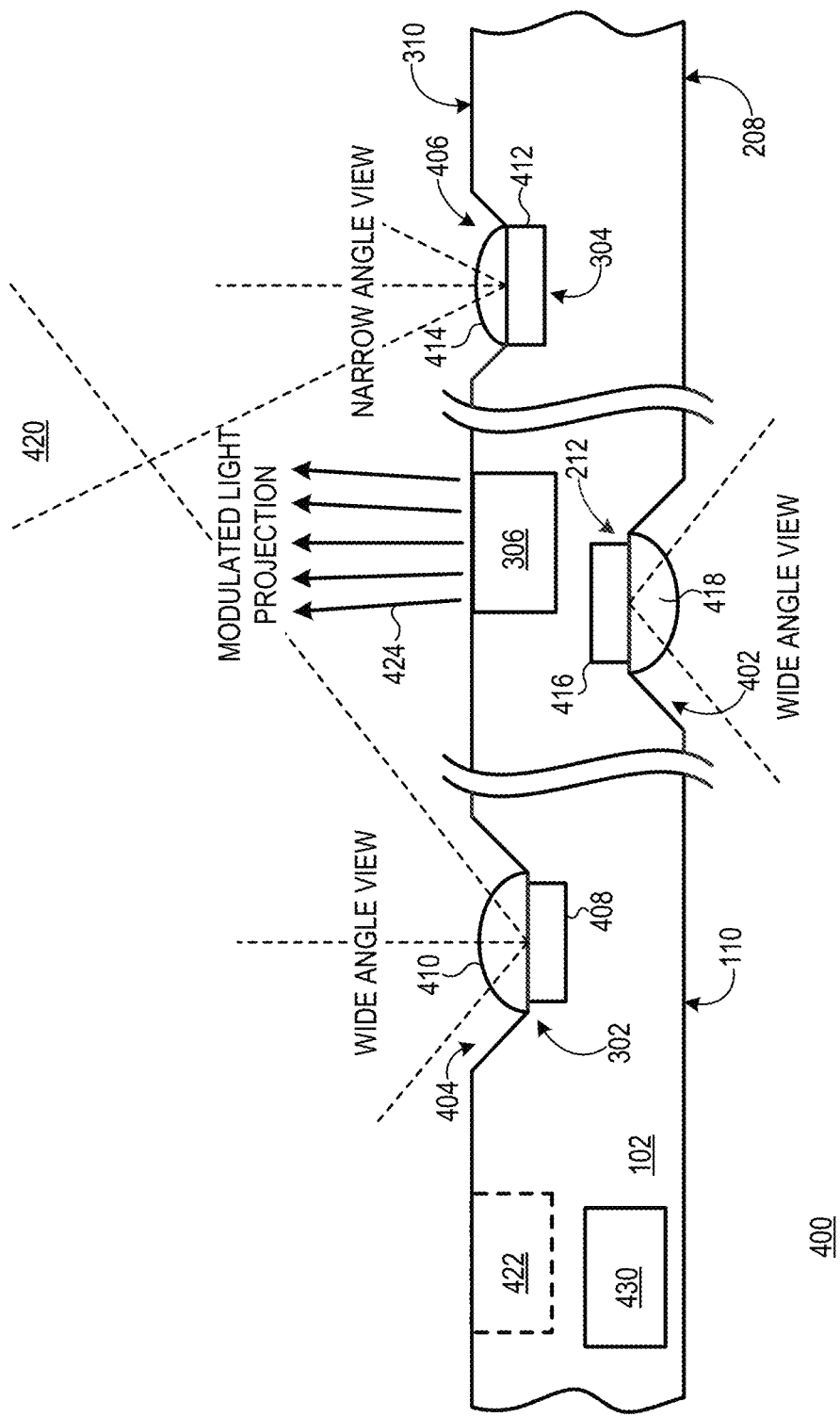
FIG. 4 illustrates an example cross-section view of the electronic device along a line depicted in the plan views of FIGS. 2 and 3 in accordance with at least one embodiment of the present disclosure.

Although FIGS. 2 and 3 illustrate the imaging cameras 212, 302, and 304 and the modulated light projector 306 aligned along a straight line for the benefit of an example cross-section view in FIG. 4, the imaging cameras 212, 302, and 304 and the modulated light projector 306 may be offset relative to each other. For example, the modulated light projector 306 may be positioned at an offset from a line extending between the imaging cameras 302 and 304, or the modulated light projector 306 and the wide-angle imaging camera 302 may be disposed along a line parallel to the top edge of the electronic device 110 and the narrow-angle imaging camera 304 may be disposed at a location offset from this line. Moreover, although the modulated light projector 306 is illustrated as positioned between the imaging cameras 302 and 304, in other implementations the modulated light projector 306 may be positioned to the outside of one of the imaging cameras 302 and 304.

FIG. 4 illustrates an example cross-section view 400 of the electronic device 110 along a line 215 depicted in the plan views of FIGS. 2 and 3 in accordance with at least one embodiment of the present disclosure. As illustrated, the electronic device 110 includes the user-facing imaging camera 212 disposed in an aperture 402 or other opening in the user-facing surface 208 and includes the wide-angle imaging camera 302 and the narrow-angle imaging camera 304 disposed in apertures 404 and 406, respectively, or other openings in the forward-facing surface 310. The wide-angle imaging camera 302 includes an image sensor 408 and one or more lenses 410 disposed over a sensing surface of the image sensor 408. The narrow-angle imaging camera 304 includes an image sensor 412 and one or more lenses 414 disposed over the sensing surface of the image sensor 412. Similarly, the user-facing imaging camera 212 includes an image sensor 416 and one or more lenses 418 disposed over the sensing surface of the image sensor 416.

The type of lens implemented for each imaging camera depends on the intended function of the imaging camera. Because the forward-facing imaging camera 302, in one embodiment, is intended for machine vision-specific imagery for analyzing the local environment, the lens 410 may be implemented as a wide-angle lens or a fish-eye lens having, for example, an angle of view between 160-180 degrees with a known high distortion. The forward-facing imaging camera 304, in one embodiment, supports user-initiated image capture, and thus the lens 414 of the forward-facing imaging camera 304 may be implemented as a narrow-angle lens having, for example, an angle of view between 80-90 degrees horizontally. Note that these angles of view are exemplary only. The user-facing imaging camera 212 likewise may have other uses in addition to supporting local environment imaging or head tracking. For example, the user-facing imaging camera 212 also may be used to support video conferencing functionality for the electronic device 110. Accordingly, depending on the application the lens 418 of the user-facing imaging camera 212 can be implemented as a narrow-angle lens, a wide-angle lens, or a fish-eye lens.

The image sensors 408, 412, and 416 of the imaging cameras 212, 302, and 304, respectively, can be implemented as charge coupled device (CCD)-based sensors, complementary metal-oxide-semiconductor (CMOS) active pixel sensors, and the like. In a CMOS-based implementation, the image sensor may include a rolling shutter sensor whereby a group of one or more rows of pixel sensors of the image sensor is read out while all other rows on the sensor continue to be exposed. This approach has the benefit of providing increased sensitivity due to the longer exposure times or more usable light sensitive area, but with the drawback of being subject to distortion due to high-speed objects being captured in the frame. The effect of distortion can be minimized by implementing a global reset mechanism in the rolling shutter so that all of the pixels on the sensor begin collecting charge simultaneously, rather than on a row-by-row basis. In a CCD-based implementation, the image sensor can be implemented as a global shutter sensor whereby all pixels of the sensor are exposed at the same time and then transferred to a shielded area that can then be read out while the next image frame is being exposed. This approach has the benefit of being less susceptible to distortion, with the downside of generally decreased sensitivity due to the additional electronics required per pixel.

In some embodiments the fields of view of the wide-angle imaging camera 302 and the narrow-angle imaging camera 304 overlap in a region 420 so that objects in the local environment in the region 420 are represented both in the image frame captured by the wide-angle imaging camera 302 and in the image frame concurrently captured by the narrow-angle imaging camera 304, thereby allowing the depth of the objects in the region 420 to be determined by the electronic device 110 through a multiview analysis of the two concurrent image frames. As such, the forward-facing imaging cameras 302 and 304 are positioned at the forward-facing surface 310 so that the region 420 covers an intended distance range and sweep relative to the electronic device 110. Moreover, as the multiview analysis relies on the parallax phenomena, the forward-facing imaging cameras 302 and 304 are sufficiently separated to provide adequate parallax for the multiview analysis.

Also illustrated in the cross-section view 400 are various example positions of the modulated light projector 306. The modulated light projector 306 projects an infrared modulated light pattern 424 in a direction generally perpendicular to the surface 310, and one or both of the forward-facing imaging cameras 302 and 304 are utilized to capture reflection of the projected light pattern 424. In the depicted example, the modulated light projector 306 is disposed at the forward-facing surface 310 at a location between the imaging cameras 302 and 304. In other embodiments, the modulated light projector 306 can be disposed at a location between one of the imaging cameras and an edge of a housing, such as at a location 422 between the wide-angle imaging camera 302 and the side of the housing, or at a location (not shown) between the narrow-angle imaging camera 304 and the side of the housing.

Some embodiments of the electronic device 110 shown in the cross-section section view 400 include other sensors 430 that are used to determine a location, pose, or trajectory of the electronic device. Examples of the sensors 430 include, but are not limited to, one or more of a gyroscope, an inertial measurement unit, an ambient light sensor, and a global positioning System (GPS). Although the sensors 430 are shown at a single location within the electronic device 110, one or more of the sensors 430 are distributed at other locations within some embodiments of the electronic device 110.

Figure 5:
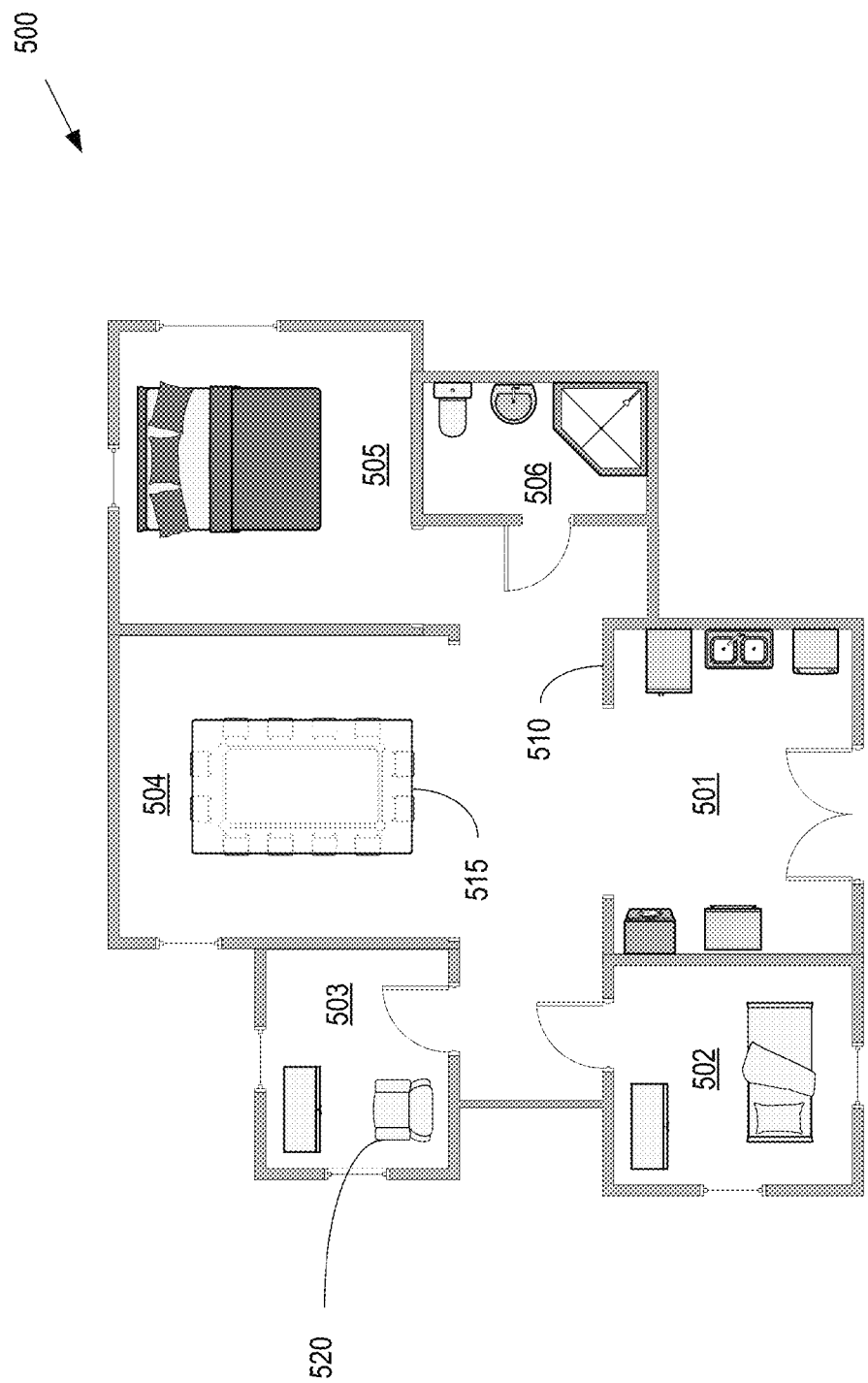
FIG. 5 illustrates a top-down view of an interior space of a building such as an apartment or house according to some embodiments.

FIG. 5 illustrates a top-down view of an interior space 500 of a building that includes various pieces of furniture according to some embodiments. Some embodiments of the interior space 100 shown in FIG. 1 correspond to a portion of the top-down view 500. Although the top-down view of the interior space 500 is shown from directly above the interior space 500, other views from more oblique angles can also be used. The interior space 500 is subdivided into several rooms including a kitchen 501, a bedroom 502, a library 503, a dining room 504, a bedroom 505, and a bathroom 506, which are collectively referred to herein as "the rooms 501-506." Some embodiments of the interior space 500 include more or fewer rooms.

The rooms 501-506 are defined by walls such as the wall 510 and include pieces of furniture such as a table 515 and a chair 520. The rooms 501-506 also include other pieces of furniture such as beds, dressers, bookshelves, toilets, sinks, showers, washing machines, refrigerators, ovens, stoves, dishwashers, and the like. In the interest of clarity, the other pieces of furniture are not indicated by reference numerals.

The wall 510, table 515, chair 520, and other pieces of furniture located within the rooms 501-506 of the are referred to as "objects."

As discussed herein, a 3D scan of the interior space 500 is acquired using an electronic device such as the electronic device 110 shown in FIG. 1. Some embodiments of the 3D scan represent the interior space 500 using color information and depth information acquired for each pixel in the 3D scan. For example, the color information can include red-green-blue (RGB) values to represent the pixel and a depth value to indicate a depth of the pixel. The depth information is represented as a distance from the camera performing the 3D scan to a surface of an object in the interior space 500 that is represented by the pixel, as a distance of the surface from a reference point in the interior space 500, or as a distance relative to some other location. As discussed herein, a 3D grid of the voxels is generated from the 3D scan. Each of the voxels represent portions of the volume of the interior space 500. A trajectory and poses of the electronic device are determined concurrently with performing the 3D scan of the interior space 500.

The voxels that represent different objects (such as the wall 510, table 515, and chair 520) are labeled based on the trajectory and the poses. In some embodiments, the labels are selected using a trained convolutional neural network (CNN) that analyzes color and depth images of the interior space 500 in conjunction with a trajectory and poses of the user equipment that is acquiring the images. The labels are selected from a set that includes labels indicating a chair, a table, a wall, and the like. For example, the CNN labels the wall 510 with the label "wall," the table 515 with the label "table," and the chair 520 with the label "chair." Augmented reality applications are then able to add additional information to the use of the interior space 500 such as a virtual painting hanging on the wall 510, a virtual board game on the table 515, or an avatar sitting in the chair 520.

A 3D mesh is generated from the 3D scan, e.g., using a marching cubes algorithm, and then the RGB images are projected onto the 3D mesh to generate a textured 3D mesh. The labels of the voxels are then transferred to vertices of the 3D mesh and, based on the labels of the vertices, the vertices are segmented into connected components that represent the objects in the interior space 500.

Figure 6:
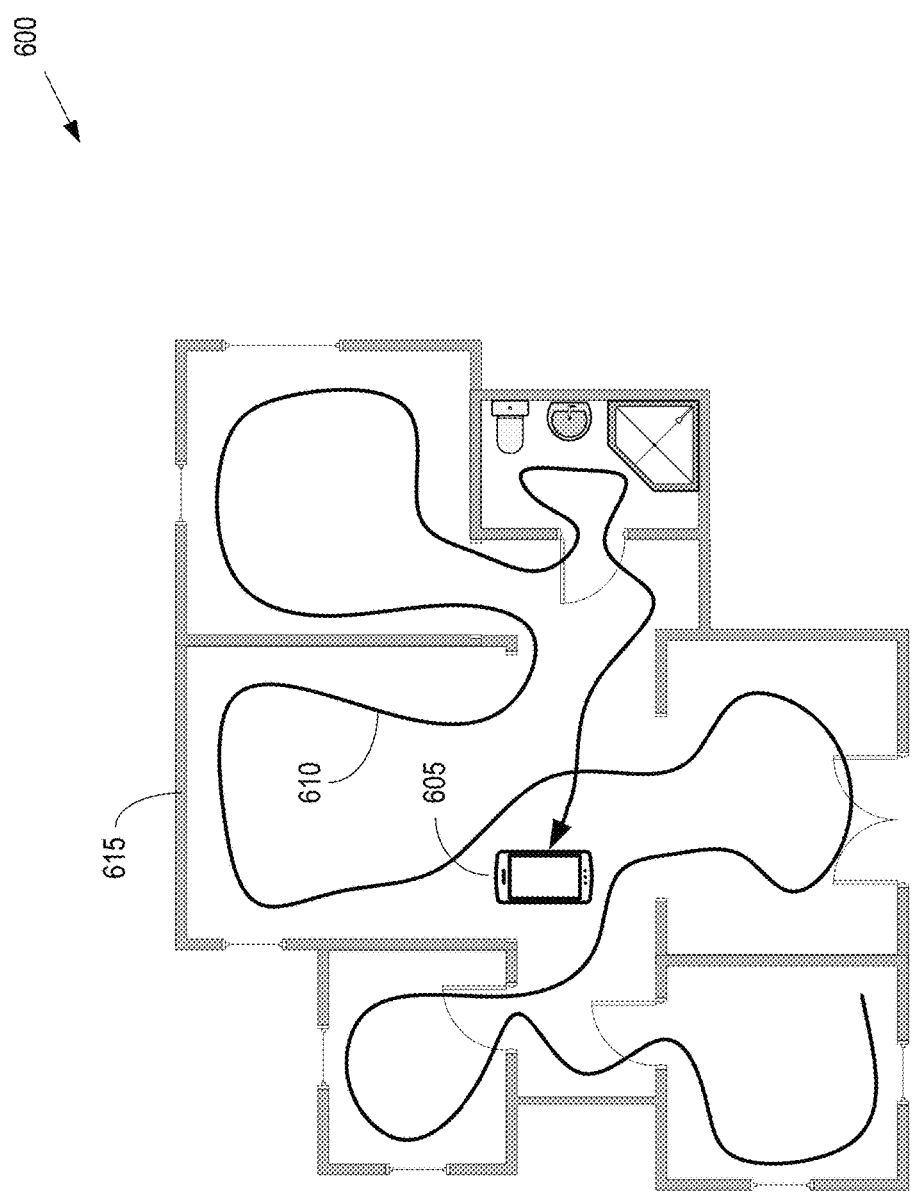
FIG. 6 illustrates a top-down view of an interior space 600 of a building such as an apartment or house according to some embodiments.

FIG. 6 illustrates a top-down view of an interior space 600 of a building such as an apartment or house according to some embodiments. Some embodiments of the interior space 100 shown in FIG. 1 and the interior space 500 shown in FIG. 5 correspond to a portion of the top-down view of the interior space 600. For example, the interior space 600 can represent the same space as the interior space 500, although the objects in the interior space 500 are not shown in FIG. 6 in the interest of clarity. A user holding a user equipment 605 moves along a path 610 through the interior space. The user equipment 605 is implemented using some embodiments of the electronic device 110 shown in FIGS. 1, 2, and 3. As the user moves along the path 610, the user points the user equipment 605 at various features of the interior space such as walls 615 (only one indicated by a reference numeral in the interest of clarity), furniture (not shown in FIG. 5 in the interest of clarity), or other features within the interior space.

The user equipment 605 generates a 3D grid representative of the interior space using images and depth values gathered during the 3D scan of the interior space. Some embodiments of the user equipment generate a 3D truncated signed distance function (TSDF) grid to represent the interior space. For example, the user equipment 605 can estimate camera poses (e.g., the pose of a camera implemented in the user equipment 605 or the pose of the user equipment 605) in real-time using visual-inertial odometry (VIO) or concurrent odometry and mapping (COM) based on information provided by sensors in the user equipment 605 such as the sensors 430 shown in FIG. 4. Depth images are then used to build the 3D volumetric TSDF grid that represents features of the interior space. Techniques for generating 3D TSDF grids are known in the art and in the interest of clarity are not discussed further herein. In some embodiments, the 3D TSDF grid is updated in response to each depth image that is acquired by the user equipment 605. Alternatively, the 3D TSDF grid is updated in response to acquiring a predetermined number of depth images or in response to a predetermined time interval elapsing. A 3D triangle mesh is extracted from the 3D TSDF grid, e.g., using a marching cubes algorithm.

The 3D TSDF grid is composed of equally sized voxels having a particular side length, e.g., 2 centimeters (cm). Each voxel stores two values: the number of observations (weight) acquired by the user equipment 605 that include the volume represented by the voxel and an estimated signed distance to a corresponding surface, such as a surface of the wall 615. Some embodiments of the user equipment 605 are configured to extract other features from the 3D TSDF grid. For example, the user equipment 605 can implement a neural network such as a convolutional neural network (CNN) is applied to the voxels in the 3D TSDF grid. The CNN learns semantic class labels that are applied to the voxels such as "chair," "table," "wall," and the like. Based on the labels, the mesh in the 3D TSDF grid is segmented into connected components that are referred to herein as "instances." Thus, the 3D TSDF grid that represents the interior space is decomposed into a set of individual objects represented by the instances that are labeled by the CNN. Some embodiments of the user equipment 605 apply post-processing to the segmented 3D TSDF grid to determine canonical poses of the objects that are identified in the 3D TSDF grid. The canonical poses are used to automatically place objects within the 3D TSDF grid.

Figure 7:
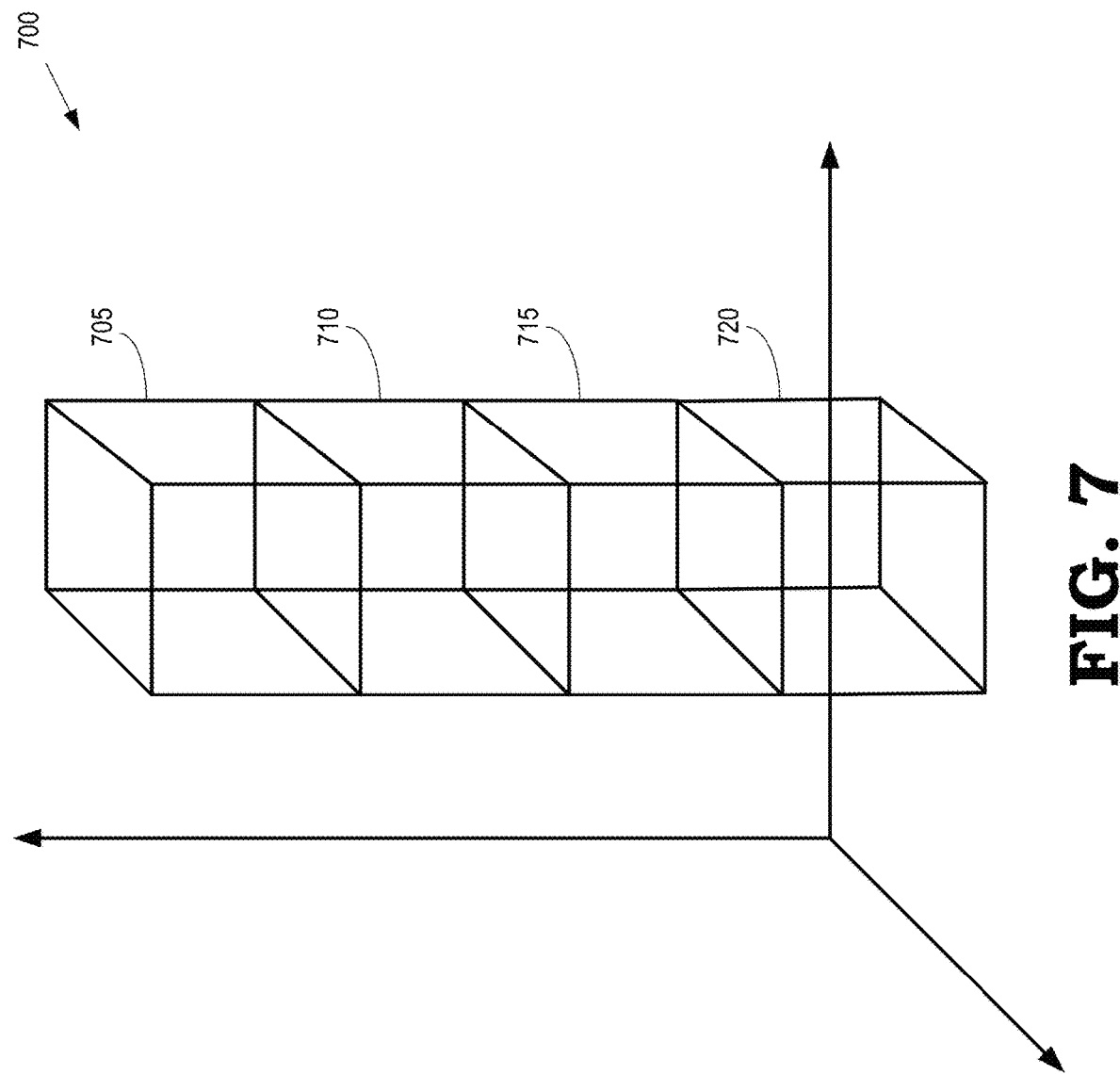
FIG. 7 is a block diagram of a portion of a 3D grid that is representative of an interior space according to some embodiments.

FIG. 7 is a block diagram of a portion 700 of a 3D grid that is representative of an interior space according to some embodiments. The portion 700 is representative of some embodiments of the interior space 100 shown in FIG. 1, the interior space 500 shown in FIG. 5 or the interior space 600 shown in FIG. 6. The portion 700 includes voxels 705, 710, 715, 720 that are arranged in a vertical column above a tile 720 in a plane of a floor plan of the interior space. As discussed herein, the voxels 705, 710, 715, 720 are associated with corresponding values that represent characteristics of the interior space such as weights and signed distances. The voxels 705, 710, 715, 720 are labeled with semantic class labels, as discussed herein.

Figure 8:
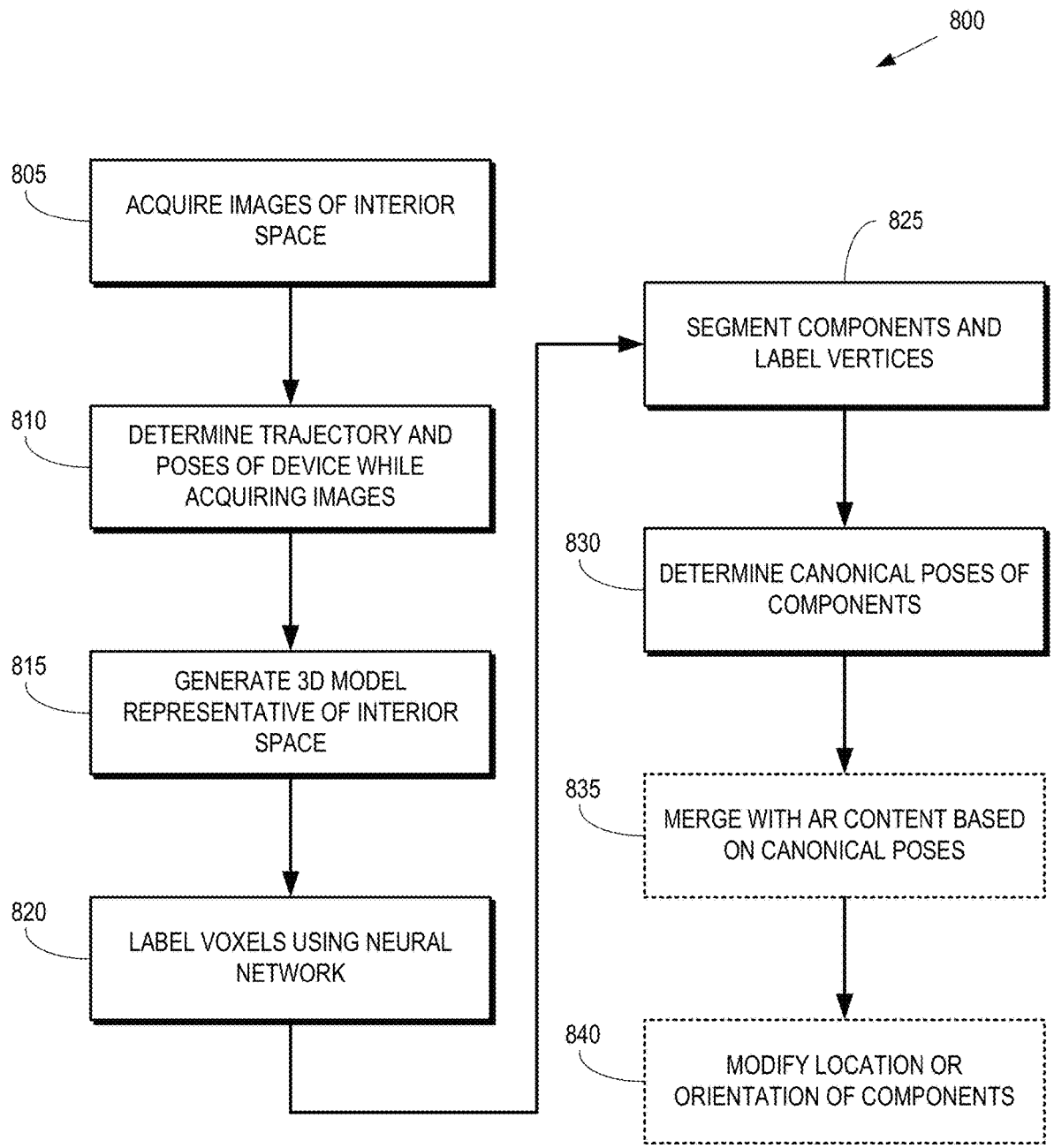
FIG. 8 is a flow diagram of a method of identifying, labeling, and segmenting objects in a 3D model of an interior space according to some embodiments.

FIG. 8 is a flow diagram of a method 800 of identifying, labeling, and segmenting objects in a 3D model of an interior space according to some embodiments. The method 800 is implemented in some embodiments of the electronic device 110 shown in FIGS. 1, 2, 3, and 4, the user equipment 505 shown in FIG. 5, and the user equipment 605 shown in FIG. 6.

At block 805, the electronic device acquires images of an interior space as a user moves through the interior space and points the electronic devices in different directions and at different features within the interior space. The dataset acquired by the electronic device includes imaging information, depth measurements relative to the image capture device, and location/movement information. For example, a smart phone can capture RGB-D data that includes RGB values of pixels in an image and depth information that represents a distance from the smart phone to a surface in the 3D space.

At block 810, the electronic device determines a trajectory of the device through the interior space, such as the trajectory 610 shown in FIG. 6. The electronic device also determines poses of the electronic device as it moves along the trajectory 610. In some embodiments, the poses are determined at a frequency that corresponds to a frequency of acquiring imaging information or depth measurements. For example, the poses can be determined each time a depth measurement is performed by the electronic device. Some embodiments of the electronic device include an inertial measurement unit (IMU) that provides inertial information such as accelerations that are used to track motion of the electronic device. Information generated by the IMU is used to determine the trajectory and the poses of the electronic device. Other techniques for determining a trajectory of the smart phone are used in some embodiments. For example, global positioning information can also be used to determine the trajectory of the smart phone.

At block 815, the electronic device generates a 3D representation or model of the interior space. Some embodiments of the electronic device generate a TSDF voxel grid that represents the interior space, as discussed herein.

At block 820, the electronic device labels the voxels that represent the interior space. In some embodiments, a neural network such as a convolutional neural network (CNN) is applied to the voxels that represent the 3D model of the space. The CNN learns semantic class labels that are applied to the voxels using training on an annotated dataset. The trained CNN then labels the voxels. For example, the CNN can apply class labels such as "chair," "table," "wall," and the like to voxels in the 3D model of the space.

At block 825, a mesh that represents the 3D model is generated from the voxel representation. The voxel labels are transferred to the vertices of the mesh. Based on the labels, the mesh representing the 3D model is segmented into connected components that are referred to herein as "instances." Thus, the 3D model of the scene is decomposed into a set of individual objects represented by the instances that are labeled by the CNN.

At block 830, the electronic device determines canonical poses of the instances represented by the segments of the mesh. Some embodiments of the electronic device determine a bounding box for each of the segments of the mesh. Objects in an interior space often have degeneracies with regard to their poses, e.g., more than one canonical pose is consistent with the information available in a mesh that represents an instance of an object. The degeneracy can be broken using other information about the object, such as a location of the back of a chair, which indicates that the orientation of the chair is in a direction indicated by a normal to the back of the chair on the side of the chair back that faces the seat of the chair. As discussed herein, some embodiments of the electronic device therefore gather information defining normal directions of triangles (or other primitives) defined by the mesh and use the frequency of the normal directions to define the canonical pose. A normal direction of a triangle or other primitive indicates a direction that is orthogonal to the surface of the triangle or other primitive.

At block 835, the segmented representation of the interior space is merged with augmented reality (AR) content based on the canonical poses. Spatial reasoning is used to position, overlay, or blend virtual objects into the augmented reality representation of the 3D scene. This operation can be performed by the electronic device or by another device that has access to the information generated by the electronic device, as indicated by the dashed line box. In some embodiments, merging the interior space with the AR content is performed at an object level granularity. For example, an augmented reality application can place an avatar in a seated position in one of the chairs in the room. For another example, an augmented reality application can place a virtual board game onto a table in the room.

At block 840, the location or orientation of components in the segmented representation of the interior space or modified. This operation can be performed by the electronic device or by another device that has access to the information generated by the electronic device, as indicated by the dashed line box. For example, a chair in the room can be moved to another location in the room for the orientation of the chair can be rotated from "window facing" to "facing the door."

In addition to merging AR content or modifying the location of the components, queries can be performed on the segmented, labeled 3D model. Examples of queries include: how many chairs are in a room? Where is the closest chair? Where is the nearest wall? Is there a table and what is the location of the table? Augmented reality applications are also able to count the number of seating options in the room, query a surface area of the walls in the room (e.g., to paint the walls), query the surface area of the floor of the room (e.g., to re-carpet the room), and the like.

Figure 9:
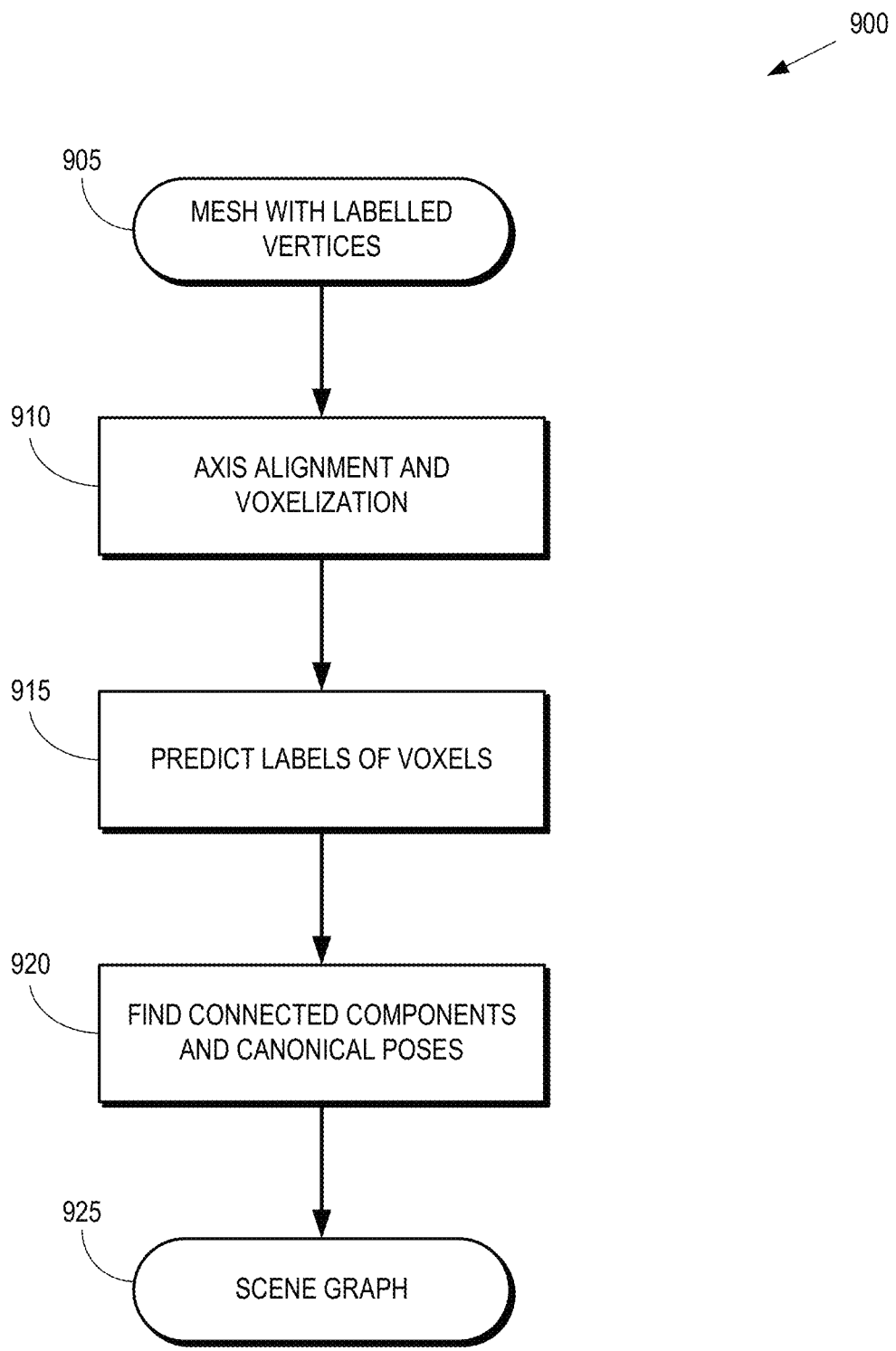
FIG. 9 is a flow diagram of a method of segmenting objects in a mesh that represents an interior space according to some embodiments.

FIG. 9 is a flow diagram of a method 900 of segmenting objects in a mesh that represents an interior space according to some embodiments. The method 900 is implemented in some embodiments of the electronic device 110 shown in FIGS. 1, 2, 3, and 4, the user equipment 505 shown in FIG. 5, and the user equipment 605 shown in FIG. 6. In the illustrated embodiment, the electronic device receives or generates input data 905 that represents a mesh with labeled vertices such as vertices that are labeled based on voxel labels determined by a CNN, as discussed herein.

At block 915, the electronic device performs access alignment and voxelization. In some embodiments, a floor is defined at Z=0 and the input mesh is aligned along an axis corresponding to the plane of the floor. A Euclidean signed distance function (ESDF) it is then used to define the voxels at a predetermined granularity.

At block 915, the electronic device predicts the semantic labels for each of the voxels. Some embodiments of the electronic device use volumetric semantic segmentation in which labels are predicted for voxels within a vertical column of voxels. Prediction of the labels is performed using a neural network such as a CNN.

At block 920, the electronic device segments the mesh into separate instances. In some embodiments, the electronic device transfers the voxel labels determined using volumetric semantic segmentation to vertices of a mesh using a majority vote. The voxels that intersect a triangle are determined using rasterization methods and the probabilities of the labels associated with the intersecting voxels (e.g., the probabilities indicated in Table 1) are summed. The vertex is then assigned the label with the highest value. In other embodiments, the electronic device transfers the voxel labels determined using volumetric semantic segmentation to vertices of a mesh using a conditional random field (CRF) to resolve ambiguities between different labels applied to the same voxels. The electronic device than identifies connected components that include vertices having the same assigned label. Canonical poses can also be assigned to the connected components.

The output data 925 generated by the electronic device includes an output scene graph. Some embodiments of the output scene graph include a list of objects, poses of the objects, and the portions of the mesh that represent the objects.

Figure 10:
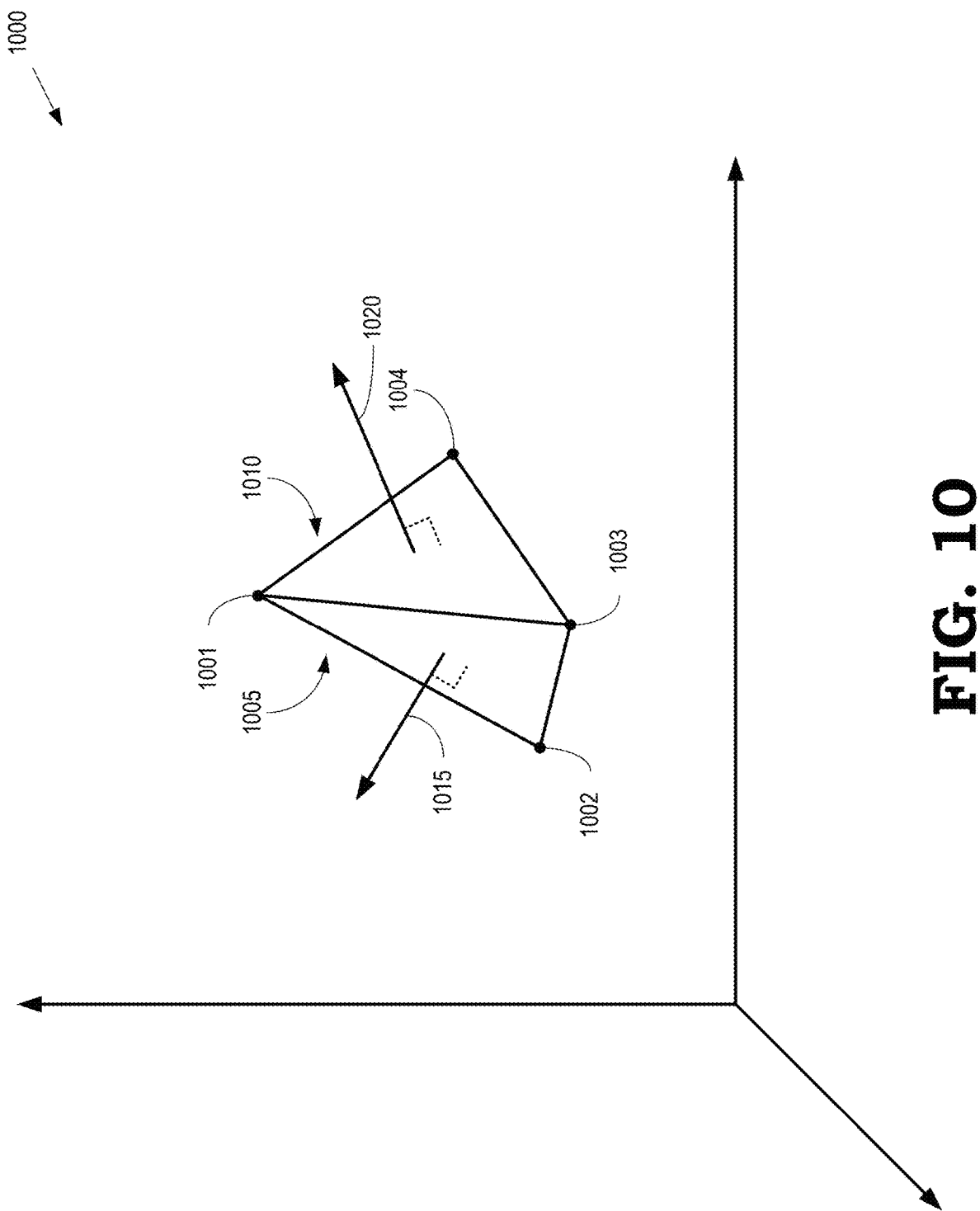
FIG. 10 illustrates a portion of a mesh that represents an object from a 3D scene according to some embodiments.

FIG. 10 illustrates a portion 1000 of a mesh that represents an object from a 3D scene according to some embodiments. The portion 1000 includes vertices 1001, 1002, 1003, 1004 of corresponding triangles 1005, 1010. In the illustrated embodiment, an electronic device determines normals 1015, 1020 to the corresponding triangles 1005, 1010. The normals 1015, 1020 are used to determine a canonical pose of the object that is represented by the portion 1000 of the mesh. In some embodiments, the normals 1015, 1020, as well as other normals of other triangles or primitives that represent the object, are used to determine the canonical pose of the object by determining a most likely orientation of the object based on a distribution of the normals.

Figure 11:
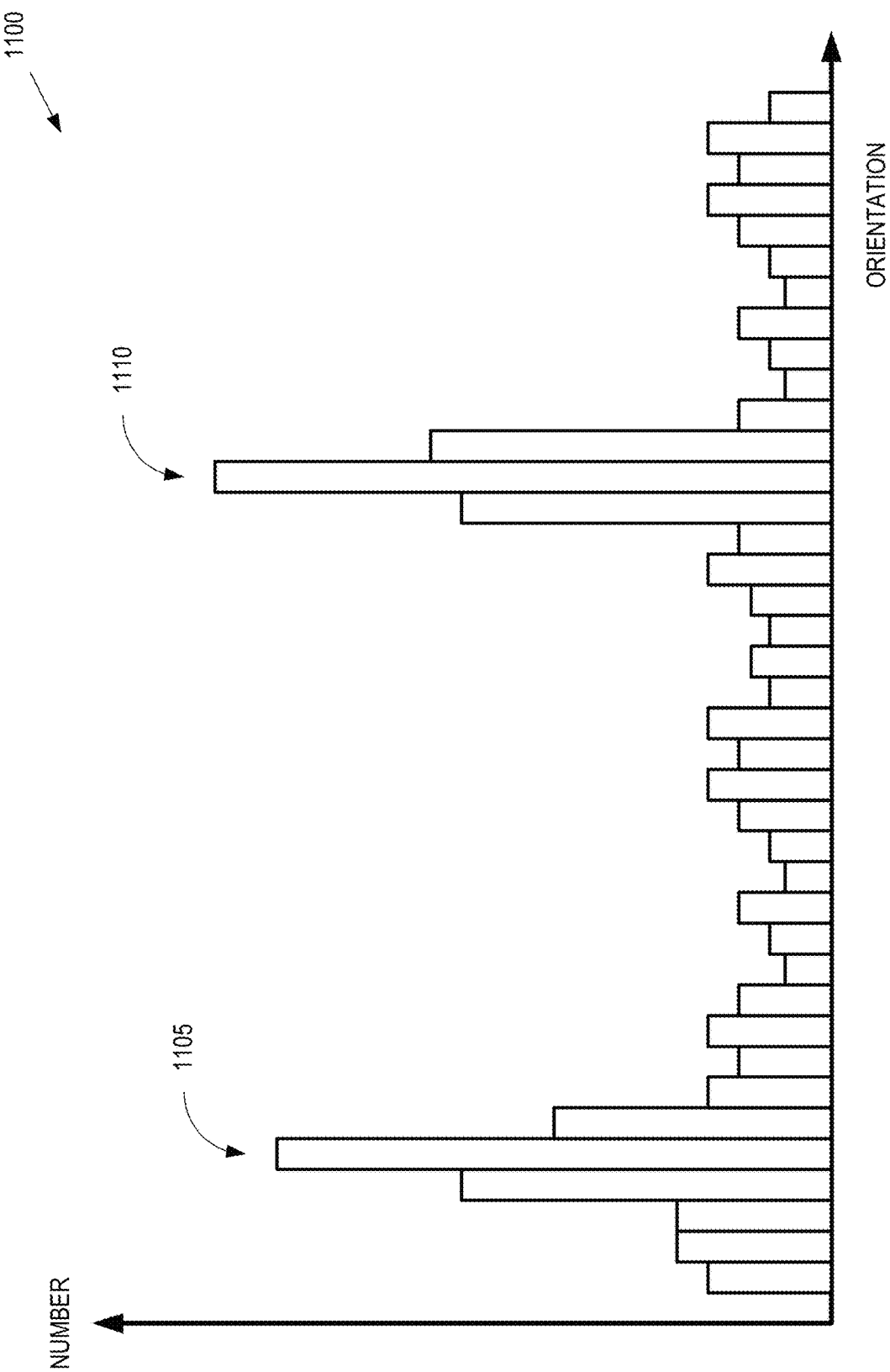
FIG. 11 illustrates a distribution of normals of triangles or other primitives in a mesh that represents an object from a 3D scene according to some embodiments.

FIG. 11 illustrates a distribution 1100 of normals of triangles or other primitives in a mesh that represents an object from a 3D scene according to some embodiments. The horizontal axis indicates different orientations and the vertical axis indicates a number of triangles having a normal in a direction or bin that spans a range of directions. The distribution 1100 has two peaks 1105, 1110, which are used to estimate an orientation of the object. In some embodiments, the highest peak 1110 is chosen as representative of the orientation of the object and the pose of the object therefore corresponds to the orientation associated with the peak 1110. In other embodiments, the peaks 1105, 1110 are considered degenerate even though one of the peaks 1105 is slightly lower than the other peak 1110. The degeneracy is broken based on other information about the object, such as an orientation of the back of a chair. For example, the peak 1105 is chosen as representative of the orientation of the chair if the orientation of the peak 1105 corresponds to the orientation of the back of the chair.

Figure 12:
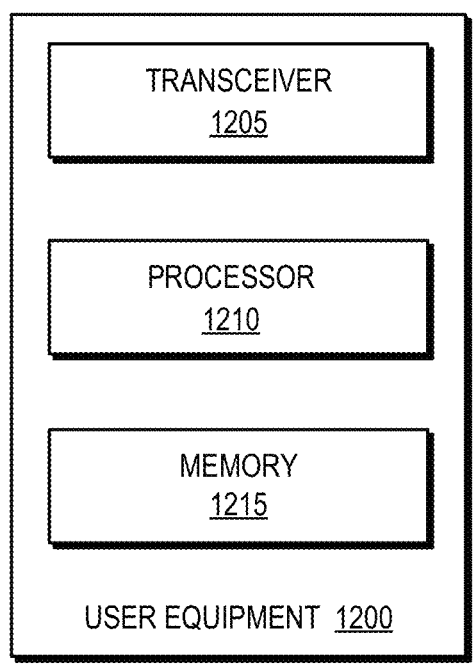
FIG. 12 is a block diagram of an electronic device that is configured to label objects in a 3D representation of the scene according to some embodiments.

FIG. 12 is a block diagram of an electronic device 1200 that is configured to label objects in a 3D representation of the scene according to some embodiments. The electronic device 1200 is used to implement some embodiments of the electronic device 110 shown in FIGS. 1, 2, 3, and 4 and the user equipment 605 shown in FIG. 6.

The electronic device 1200 includes a transceiver 1205 that is used to support communication with other devices. Some embodiments of the electronic device 1200 are implemented in user equipment, in which case the transceiver 1205 is configured to support communication over an air interface. The electronic device 1200 also includes a processor 1210 and a memory 1215. The processor 1210 is configured to execute instructions such as instructions stored in the memory 1215 and the memory 1215 is configured to store instructions, data that is to be operated upon by the instructions, or the results of instructions performed by the processor 1210. The electronic device 1200 is therefore able to implement some embodiments of the method 800 shown in FIG. 8 and the method 900 shown in FIG. 9.

Figure 13:
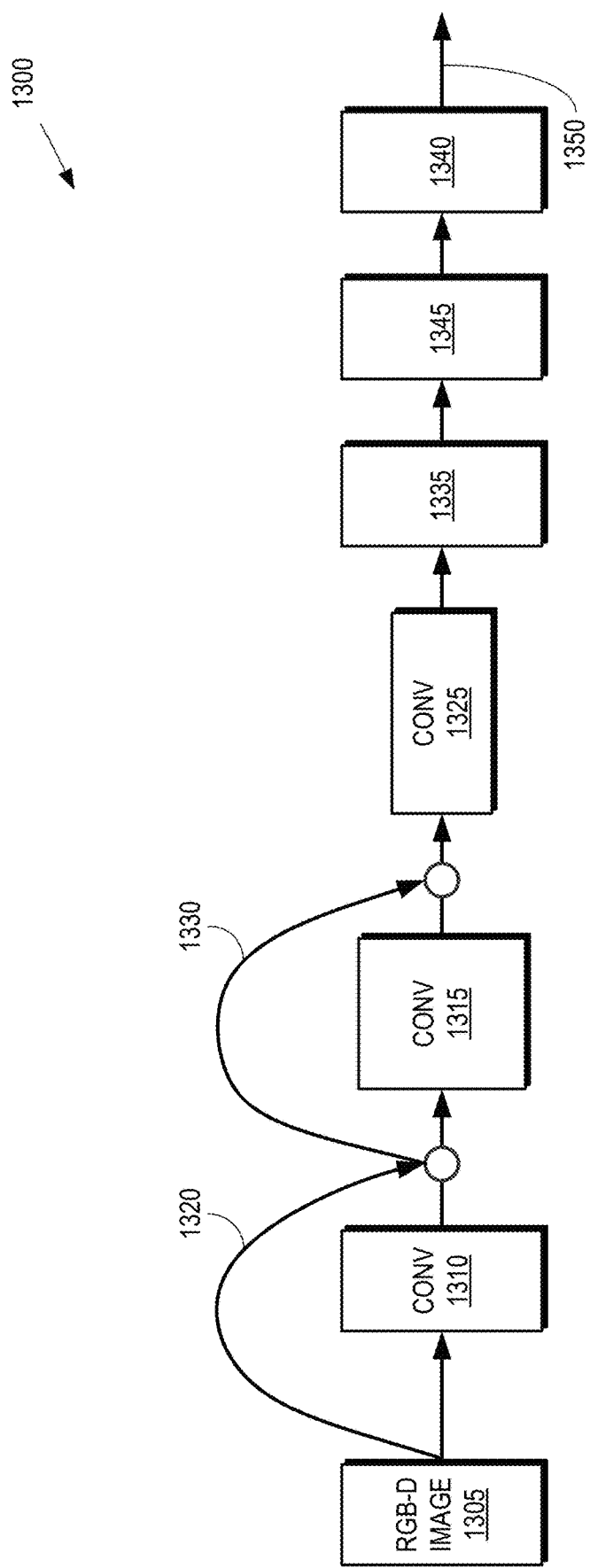
FIG. 13 is a block diagram of a convolutional neural network (CNN) that is trained to label objects in an interior space according to some embodiments.

FIG. 13 is a block diagram of a CNN 1300 that is trained to label objects in an interior space according to some embodiments. The CNN 1300 is used to analyze some embodiments of the interior space 500 shown in FIG. 5 in the interior space 600 shown in FIG. 6. In the illustrated embodiment, the CNN 1300 is implemented as a residual network. However, other embodiments of the CNN 1300 are implemented as different types of neural networks.

Input 1305 to the CNN 1300 includes a 2D color image representing the interior space. The input 1305 also includes a corresponding 2D depth image to indicate depths of each location within the interior space. Convolutional layer 1310 receives the input 1305. The convolutional layer 1310 implements a convolutional function that is defined by a set of parameters, which are trained on the basis of one or more training datasets. The parameters include a set of learnable filters (or kernels) that have a small receptive field and extend through a full depth of an input volume of the convolutional layer 1310. The parameters can also include a depth parameter, a stride parameter, and a zero-padding parameter that control the size of the output volume of the convolutional layer 1310. The convolutional layer 1310 applies a convolution operation to the input 1305 and provides the results of the convolution operation to a subsequent convolutional layer 1315. The CNN 1300 also includes an identity shortcut connection 1320 that allows an identity portion of the input 1305 to bypass the convolutional layers 1310. In the illustrated embodiment, the CNN 1300 includes additional convolutional layers 1325 and an additional identity shortcut connection 1330. Some embodiments of the CNN 1300 include more or fewer convolutional layers or identity shortcut connections.

Results of the convolution operations performed by the convolutional layers 1310, 1315, 1325 are provided to fully connected layers 1335, 1340 and DO layer 1345. The neurons in the fully connected layers 1335, 1340 are connected to every neuron in another layer, such as the convolutional layers 1325 or the other fully connected layers. The fully connected layers 1335, 1340 typically implement functionality that represents the high-level reasoning that produces an output 1350 that represents the labels generated by the CNN 1300. For example, if the CNN 1300 is trained to perform image recognition, the fully connected layers 1335, 1340 implement the functionality that labels portions of the image that have been "recognized" by the CNN 1300. For example, the fully connected layers 1335, 1340 can recognize portions of an interior space as objects that have a particular function, in which case the fully connected layers 1335, 1340 label the portions using the corresponding object labels such as "chair," "table," and the like. The functions implemented in the fully connected layers 1335, 1340 are represented by values of parameters that are determined using a training dataset, as discussed herein.

The output 1350 of the CNN 1300 is a vector that represents probabilities that a portion of the interior space is labeled as one of a set of labels indicating an object type, such as a chair, a table, a wall, and the like.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   performing, with an electronic device, a three-dimensional (3D) scan of an interior space;
   accessing voxels in a 3D grid that is generated from the 3D scan, wherein the voxels represent portions of a volume of the interior space;
   determining a trajectory and one or more poses of the electronic device concurrently with performing the 3D scan of the interior space;
   determining one or more canonical poses of objects in the interior space based on a 3D model of the interior space; and
   labeling voxels representing the objects in the interior space based on the trajectory, the one or more poses of the electronic device, and the one or more canonical poses of the objects, wherein each voxel is associated with a probability distribution indicating probabilities of each class label based in part on the one or more canonical poses of the objects.

2. The method of claim 1, wherein performing the 3D scan of the interior space comprises acquiring imaging information, depth measurements relative to the electronic device, and location or movement information for the electronic device.

3. The method of claim 2, wherein acquiring the location or movement information comprises acquiring accelerations that are used to track motion of the electronic device using an inertial measurement unit (IMU) implemented in the electronic device.

4. The method of claim 1, wherein labeling the voxels comprises identifying types of objects in the interior space by applying a convolutional neural network to the voxels, wherein the convolutional neural network is trained using an annotated dataset.

5. The method of claim 1, further comprising:
   transferring labels of the voxels to vertices of a mesh that represents a 3D model of the interior space; and
   based on the labels of the vertices, segmenting the vertices into connected components that represent the objects in the interior space.

6. The method of claim 5, further comprising:
   determining poses of the objects based on the connected components.

7. The method of claim 6, further comprising:
   performing spatial reasoning at an object level of granularity by applying queries to the 3D model represented by the connected components.

8. The method of claim 6, further comprising:
   positioning, overlaying, or blending virtual objects into an augmented reality representation of a 3D scene based on the poses and locations of the connected components.

9. The method of claim 6, further comprising:
   modifying a position or an orientation of one of the objects by applying a transformation to a corresponding one of the connected components.

10. An electronic device comprising:
    an imaging camera and a depth sensor configured to perform a three-dimensional (3D) scan of an interior space; and
    a processor configured to:
      access voxels in a 3D grid that is generated from the 3D scan, wherein the voxels represent portions of a volume of the interior space;
      determine a trajectory and one or more poses of the electronic device concurrently with performing the 3D scan of the interior space;
      determine one or more canonical poses of objects in the interior space based on a 3D model of the interior space; and
      label voxels representing the objects in the interior space based on the trajectory, the one or more poses of the electronic device, and the one or more canonical poses of the objects, wherein each voxel is associated with a probability distribution indicating probabilities of each class label based in part on the one or more canonical poses of the objects.

11. The electronic device of claim 10, wherein the imaging camera is configured to acquire imaging information, and wherein the depth sensor is configured to acquire depth measurements relative to the electronic device.

12. The electronic device of claim 11, further comprising:
an inertial measurement unit (IMU) configured to acquire location or movement information for the electronic device based on accelerations that are detected by the IMU.

13. The electronic device of claim 10, wherein the processor is configured to identify types of objects in the interior space by applying a convolutional neural network to the voxels, wherein the convolutional neural network is trained using an annotated dataset.

14. The electronic device of claim 13, wherein the processor is configured to:
transfer labels of the voxels to vertices of a mesh that represents a 3D model of the interior space; and
based on the labels of the vertices, segment the vertices into connected components that represent the objects in the interior space.

15. The electronic device of claim 14, wherein the processor is configured to determine poses of the objects based on the connected components.

16. The electronic device of claim 15, wherein the processor is configured to perform spatial reasoning at an object level of granularity by applying queries to the 3D model represented by the connected components.

17. The electronic device of claim 15, wherein the processor is configured to position, overlay, or blend virtual objects into an augmented reality representation of a 3D scene based on the poses and locations of the connected components.

18. The electronic device of claim 15, wherein the processor is configured to modify a position or an orientation of one of the objects by applying a transformation to a corresponding one of the connected components.

19. A method comprising:
acquiring, with an electronic device, imaging information and depth measurements relative to the electronic device;
determining, at the electronic device, a trajectory and one or more poses of the electronic device concurrently with acquiring the imaging information and depth measurements; determining one or more canonical poses of objects in an interior space based on a 3D model of the interior space;
segmenting vertices of a mesh that represents the 3D model of a scene into connected components that represent the objects in the scene based on labels of the vertices that represent the objects in the scene, wherein the labels are determined based on the trajectory, the one or more poses, and the one or more canonical poses of the objects; and
labeling voxels representing the objects in the interior space, wherein each voxel is associated with a probability distribution indicating probabilities of each class label based in part on the one or more canonical poses of the objects.

20. The method of claim 19, further comprising:
determining poses of the objects based on the connected components; and
modifying the scene based on the poses of the objects.

* * * * *